US010542107B2

(12) United States Patent
Johnson

(10) Patent No.: US 10,542,107 B2
(45) Date of Patent: *Jan. 21, 2020

(54) ORIGIN SERVER PROTECTION NOTIFICATION

(71) Applicant: CLOUDFLARE, INC., San Francisco, CA (US)

(72) Inventor: Evan Johnson, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,863

(22) Filed: Jan. 7, 2019

(65) Prior Publication Data

US 2019/0166215 A1    May 30, 2019

Related U.S. Application Data

(63) Continuation of application No. 15/369,711, filed on Dec. 5, 2016, now Pat. No. 10,178,195.

(60) Provisional application No. 62/263,608, filed on Dec. 4, 2015.

(51) Int. Cl.
| | | |
|---|---|---|
| *G06F 15/177* | (2006.01) | |
| *H04L 29/08* | (2006.01) | |
| *H04L 29/12* | (2006.01) | |
| *H04L 29/06* | (2006.01) | |
| *H04L 12/26* | (2006.01) | |

(52) U.S. Cl.
CPC ............ *H04L 67/26* (2013.01); *H04L 43/065* (2013.01); *H04L 61/1511* (2013.01); *H04L 63/1433* (2013.01); *H04L 67/02* (2013.01); *H04L 67/10* (2013.01); *H04L 67/1036* (2013.01)

(58) Field of Classification Search
USPC ......................................................... 709/220
See application file for complete search history.

(56) References Cited

U.S. PATENT DOCUMENTS

| | | |
|---|---|---|
| 6,836,806 B1 | 12/2004 | Raciborski et al. |
| 6,904,460 B1 | 6/2005 | Raciborski et al. |
| 6,968,389 B1 | 11/2005 | Menditto et al. |
| 6,981,029 B1 | 12/2005 | Menditto et al. |
| 6,992,983 B1 | 1/2006 | Chatterjee et al. |
| 7,013,343 B2 | 3/2006 | Shigezumi et al. |
| 7,213,062 B1 | 5/2007 | Raciborski et al. |
| 7,370,351 B1 | 5/2008 | Ramachandran et al. |
| 7,487,539 B2 | 2/2009 | Ramachandran et al. |

(Continued)

OTHER PUBLICATIONS

Lu Y., et al., "Towards Plugging Privacy Leaks in the Domain Name System," IEEE Tenth International Conference on Peer-to-Peer Computing (P2P), Aug. 25-27, 2010, 10 pages.

(Continued)

*Primary Examiner* — Alicia Baturay
(74) *Attorney, Agent, or Firm* — Nicholson De Vos Webster & Elliott LLP

(57) ABSTRACT

Domain Name System (DNS) records of a single site are analyzed. A first one of the DNS records points to an IP address of a service. A second one of the DNS records is not pointed to an IP address of the service and is referencing the first DNS record. An electronic communication is transmitted to an operator for the single site that includes a notification that an IP address of the single site is exposed through the second DNS record.

21 Claims, 16 Drawing Sheets

(56) References Cited

U.S. PATENT DOCUMENTS

| | | |
|---|---|---|
| 7,493,414 B2 | 2/2009 | Tazuma et al. |
| 7,502,836 B1 | 3/2009 | Menditto et al. |
| 7,565,413 B1 | 7/2009 | O'Toole, Jr. et al. |
| 7,574,499 B1 | 8/2009 | Swildens et al. |
| 7,624,169 B2 | 11/2009 | Lisiecki et al. |
| 7,680,742 B1 | 3/2010 | Ackerman et al. |
| 7,680,955 B2 | 3/2010 | Huang et al. |
| 7,681,229 B1 | 3/2010 | Ebrahimi et al. |
| 7,792,994 B1 | 9/2010 | Hernacki et al. |
| 7,827,280 B2 | 11/2010 | Cox et al. |
| 7,849,502 B1 | 12/2010 | Bloch et al. |
| 7,849,507 B1 | 12/2010 | Bloch et al. |
| 7,925,694 B2 | 4/2011 | Harris et al. |
| 7,984,163 B2 | 7/2011 | Almog et al. |
| 8,078,683 B2 | 12/2011 | Lalonde et al. |
| 8,204,976 B2 | 6/2012 | Swildens et al. |
| 8,260,963 B2 | 9/2012 | Huang et al. |
| 8,266,295 B2 | 9/2012 | Klein et al. |
| 8,285,808 B1 | 10/2012 | Joel et al. |
| 8,332,484 B2 | 12/2012 | Afergan et al. |
| 8,370,940 B2 | 2/2013 | Holloway et al. |
| 8,447,856 B2 | 5/2013 | Drako et al. |
| 8,489,637 B2 | 7/2013 | Patil et al. |
| 8,499,077 B2 | 7/2013 | Niemelae et al. |
| 8,526,467 B2 | 9/2013 | Li et al. |
| 8,548,998 B2 | 10/2013 | Plotnik et al. |
| 8,549,148 B2 | 10/2013 | Devarapalli et al. |
| 8,572,737 B2 | 10/2013 | Holloway et al. |
| 8,612,564 B2 | 12/2013 | Swildens et al. |
| 8,613,089 B1 | 12/2013 | Holloway et al. |
| 8,621,038 B1 | 12/2013 | Prince et al. |
| 8,645,700 B2 | 2/2014 | Smith et al. |
| 8,645,701 B2 | 2/2014 | Gould et al. |
| 8,646,064 B1 | 2/2014 | Holloway et al. |
| 8,751,633 B2 | 6/2014 | Holloway et al. |
| 8,762,506 B2 | 6/2014 | Courtney et al. |
| 8,763,071 B2 | 6/2014 | Sinha et al. |
| 8,806,011 B1 | 8/2014 | Graham-Cumming et al. |
| 8,819,209 B1 | 8/2014 | Chen et al. |
| 8,825,839 B2 | 9/2014 | Brandt et al. |
| 8,843,612 B2 | 9/2014 | Levow et al. |
| 8,849,904 B2 | 9/2014 | Prince et al. |
| 8,850,580 B2 | 9/2014 | Prince et al. |
| 8,856,924 B2 | 10/2014 | Holloway et al. |
| 8,874,790 B2 | 10/2014 | McPherson et al. |
| 8,880,686 B2 | 11/2014 | McPherson et al. |
| 8,910,245 B2 | 12/2014 | Kondamuru et al. |
| 8,914,406 B1 | 12/2014 | Haugsnes et al. |
| 8,984,166 B2 | 3/2015 | Graham-Cumming et al. |
| 8,984,635 B1 | 3/2015 | Graham-Cumming et al. |
| 9,009,330 B2 | 4/2015 | Holloway et al. |
| 9,021,085 B1 | 4/2015 | Jensen et al. |
| 9,038,183 B1 | 5/2015 | Haugsnes et al. |
| 9,049,227 B2 | 6/2015 | Surasathian et al. |
| 9,049,244 B2 | 6/2015 | Prince et al. |
| 9,049,247 B2 | 6/2015 | Holloway et al. |
| 9,098,477 B2 | 8/2015 | Joel et al. |
| 9,106,695 B2 | 8/2015 | Kaminsky et al. |
| 9,112,897 B2 | 8/2015 | Teo et al. |
| 9,130,917 B2 | 9/2015 | Smith et al. |
| 9,137,258 B2 | 9/2015 | Haugsnes et al. |
| 9,167,001 B1 | 10/2015 | Haugsnes et al. |
| 9,183,319 B2 | 11/2015 | Joel et al. |
| 9,184,919 B2 | 11/2015 | Ghosh et al. |
| 9,202,079 B2 | 12/2015 | Kaliski, Jr. et al. |
| 9,225,734 B1 | 12/2015 | Hastings et al. |
| 9,300,687 B2 | 3/2016 | Johns et al. |
| 9,305,182 B1 | 4/2016 | Berls et al. |
| 9,319,315 B2 | 4/2016 | Prince et al. |
| 9,338,182 B2 | 5/2016 | Devarapalli et al. |
| 9,342,620 B2 | 5/2016 | Joel et al. |
| 9,342,698 B2 | 5/2016 | McPherson et al. |
| 9,350,829 B2 | 5/2016 | Graham-Cumming et al. |
| 9,363,287 B2 | 6/2016 | Kondamuru et al. |
| 9,363,288 B2 | 6/2016 | Kaliski, Jr. et al. |
| 9,369,437 B2 | 6/2016 | Holloway et al. |
| 9,401,919 B2 | 7/2016 | Sullivan et al. |
| 9,467,421 B2 | 10/2016 | Xie et al. |
| 9,467,461 B2 | 10/2016 | Balderas et al. |
| 9,509,596 B2 | 11/2016 | Bergman et al. |
| 9,544,278 B2 | 1/2017 | Hozza et al. |
| 9,548,966 B2 | 1/2017 | Prince et al. |
| 9,560,074 B2 | 1/2017 | Stemm et al. |
| 9,565,166 B2 | 2/2017 | Holloway et al. |
| 9,571,286 B2 | 2/2017 | Graham-Cumming et al. |
| 9,578,087 B1 | 2/2017 | Kitchen et al. |
| 9,584,328 B1 | 2/2017 | Graham-Cumming et al. |
| 9,628,509 B2 | 4/2017 | Holloway et al. |
| 9,628,581 B2 | 4/2017 | Holloway et al. |
| 9,634,993 B2 | 4/2017 | Holloway et al. |
| 9,634,994 B2 | 4/2017 | Prince et al. |
| 9,641,549 B2 | 5/2017 | Holloway et al. |
| 9,647,979 B2 | 5/2017 | Gupta et al. |
| 9,661,020 B2 | 5/2017 | Holloway et al. |
| 9,705,851 B2 | 7/2017 | Kaliski, Jr. et al. |
| 9,722,970 B2 | 8/2017 | Prince et al. |
| 9,729,657 B2 | 8/2017 | Graham-Cumming et al. |
| 9,749,307 B2 | 8/2017 | Smith et al. |
| 9,769,273 B2 | 9/2017 | Gupta et al. |
| 9,774,562 B2 | 9/2017 | Blinn et al. |
| 9,781,091 B2 | 10/2017 | Shyamsunder et al. |
| 9,819,721 B2 | 11/2017 | Bendell et al. |
| 9,887,914 B2 | 2/2018 | Bergman et al. |
| 9,906,488 B2 | 2/2018 | Kagan et al. |
| 9,935,771 B2 | 4/2018 | Pandrangi et al. |
| 10,020,941 B2 | 7/2018 | Shulman et al. |
| 10,021,102 B2 | 7/2018 | Palchaudhuri et al. |
| 10,068,014 B2 | 9/2018 | Bergman et al. |
| 10,102,301 B2 | 10/2018 | Holloway et al. |
| 10,178,195 B2 * | 1/2019 | Johnson ................ H04L 43/065 |
| 2003/0061515 A1 | 3/2003 | Kindberg et al. |
| 2004/0255137 A1 | 12/2004 | Ying et al. |
| 2006/0167871 A1 | 7/2006 | Sorenson et al. |
| 2007/0214283 A1 | 9/2007 | Metke et al. |
| 2008/0209057 A1 | 8/2008 | Martini et al. |
| 2009/0055929 A1 | 2/2009 | Lee et al. |
| 2010/0318681 A1 | 12/2010 | Shi et al. |
| 2012/0084423 A1 | 4/2012 | McGleenon et al. |
| 2012/0254386 A1 | 10/2012 | Smith et al. |
| 2013/0024769 A1 | 1/2013 | Sumida et al. |
| 2014/0156702 A1 | 6/2014 | Shyamsunder et al. |
| 2015/0134956 A1 | 5/2015 | Stachura et al. |
| 2015/0186544 A1 | 7/2015 | Benedum et al. |
| 2016/0014087 A1 | 1/2016 | Holloway et al. |
| 2016/0036848 A1 | 2/2016 | Reddy et al. |
| 2016/0285961 A1 | 9/2016 | Kisel et al. |
| 2016/0308818 A1 | 10/2016 | Torres et al. |
| 2017/0063792 A1 | 3/2017 | Lee et al. |
| 2017/0134405 A1 | 5/2017 | Ahmadzadeh et al. |
| 2018/0046811 A1 | 2/2018 | Andriani et al. |

OTHER PUBLICATIONS

Notice of Allowance from U.S. Appl. No. 15/369,711, dated Nov. 26, 2018, 19 pages.

* cited by examiner

ORIGIN SERVER PROTECTION NOTIFICATION

CROSS-REFERENCE TO RELATED APPLICATIONS

This application is a continuation of U.S. application Ser. No. 15/369,711, filed Dec. 5, 2016, which claims the benefit of U.S. Provisional Application No. 62/263,608, filed Dec. 4, 2015, which are hereby incorporated by reference.

FIELD

Embodiments of the invention relate to the field of network services; and more specifically to origin server protection notification.

BACKGROUND

Traffic for an origin server may be proxied through a service such that one or more proxies receive and/or process traffic instead of that traffic being directly received at the origin server. Such a service may provide security services (e.g., detecting and/or mitigating denial of service attacks, proactively stopping botnets, cleaning viruses, trojans, and/or worms, etc.) and/or other performance services (e.g., acting as a node in a content delivery network (CDN) and dynamically caching customer's files closer to visitors, TCP stack optimizations, etc.). Registering for such a service may include a modification of the network configuration, such as Domain Name System (DNS) settings, so that the traffic is proxied through one or more proxy servers instead of being directly received by the origin server.

Information about a proxied origin server (e.g., the IP address of the origin server) can be inadvertently exposed through their service configuration. This may make the origin server vulnerable to malicious actors who use that information to mount cyber attacks against the operator of the proxied origin server.

BRIEF DESCRIPTION OF THE DRAWINGS

The invention may best be understood by referring to the following description and accompanying drawings that are used to illustrate embodiments of the invention. In the drawings:

FIGS. 10A-B illustrate a configuration screen that allows customers to configure certain one(s) of their subdomains to be protected by the service according to one embodiment;

FIG. 11 illustrates a name server configuration screen that provides a number of name server addresses of the service according to one embodiment;

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for notifying an origin server of potential leaking information is described herein according to an embodiment. An origin server has been registered, or is in the process of being registered, for a proxied service that includes changing Domain Name System (DNS) configurations such that certain network traffic is proxied at a proxy server instead of that traffic being received directly at the origin server. The service checks the configuration and determines if there is any flaw in the configuration that may cause information about the origin server (e.g., the IP address of the origin server) to be leaked. Upon finding a flaw in the configuration, the service may notify the origin server and/or the operator of the origin server that the information may be leaked.

Figure 1:
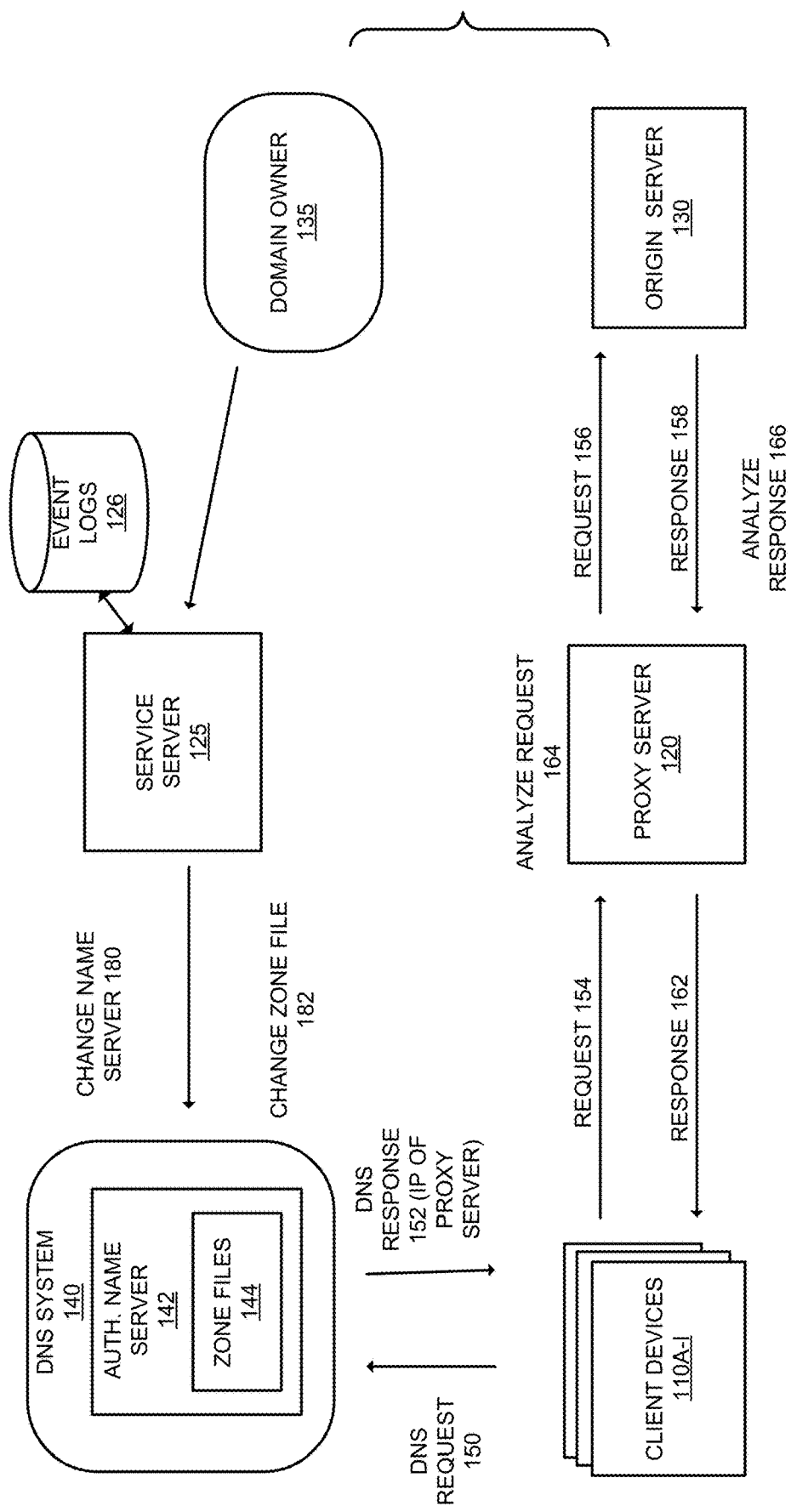
FIG. 1 is a system diagram that illustrates an exemplary proxied service according to an embodiment.

FIG. 1 is a system diagram that illustrates an exemplary proxied service according to an embodiment. The service, which is available over the Internet and may not require customers (e.g., owners of a domain and/or personnel working on behalf of domain owner) to install hardware or software, may provide security services (e.g., detecting and/or mitigating denial of service attacks, proactively stopping botnets, cleaning viruses, trojans, and/or worms, etc.) and/or other performance services (e.g., acting as a node in a content delivery network (CDN) and dynamically caching customer's files closer to visitors, TCP stack optimizations, etc.).

In an embodiments, a customer may register for the service including modifying their network configuration (e.g., DNS settings) so that the traffic is proxied through one or more proxy servers instead of being directly received by the origin server. For instance, the authoritative name server may be changed to an authoritative name server of the service, and also the IP address(es) that resolve to their origin server(s) (which hosts content of their domain) may be changed to point to a proxy server of the service. As another example, a customer may change individual DNS records to point to a proxy server (or point to other domain (s) that point to a proxy server of the service). For example, a customer may change their DNS records to point to a CNAME that corresponds with a proxy server of the service.

The domain owner 135 is a customer of the service and registers at least a part of their website for the service, which will be described in greater detail later herein. Registering for service may include causing the authoritative name server for the domain of the customer to be changed to the authoritative name server 142 of the service at operation 180. It should be understood that the backup authoritative name servers serving the domain may also be changed to an authoritative name server of the service. The zone file records for the domains may also be changed such that DNS resolution requests for the protected subdomains owned by the domain owner 135, which are handled by the origin sever 130, resolve to the proxy server 120, at operation 182. In an embodiment, the customer (e.g., domain owner 135) or other entity (e.g., web administrators) on behalf of the domain owner 135) may use the service server 125 to change their authoritative name server to the authoritative name server 142 and change their zone file to have their domain point to the service proxy server (hereinafter "proxy server") 120.

The service server 125, operated by the service, provides a set of tools and interfaces for the domain owner 135 and is accessible over the Internet. For example, the service server 125, among other things, allows the domain owner 135 to register for the service, view statistics/logs of events, and report suspicious events. The service server 125 may include tools to assist the domain owners 135 in changing their network configuration such that certain traffic is proxied through the proxy server 120. In an embodiment, the service server 125 checks the configuration and determines if there is any flaw in the configuration that may cause information about the origin server (e.g., the IP address of the origin server) to be leaked. Upon finding a flaw in the configuration, the service server 125 may notify the origin server 130 and/or the domain owner 135 of the origin server 130 that the information may be leaked.

The DNS system 140 is used to refer to the DNS system as a whole and includes multiple DNS servers to resolve DNS requests. As illustrated, the DNS system 140 includes the authoritative name server 142, which is an authoritative name server for the service. When the DNS system 140 resolves a request for a subdomain protected by the service (proxied through the proxy server 120), the corresponding DNS response includes an IP address of the proxy server 120 instead of the origin server 130. It should also be understood that when the DNS system 140 resolves a request for a subdomain not protected by the service (not proxied through the proxy server 120), the corresponding DNS response includes an IP address of the origin server 130.

The client devices 110A-I are computing devices (e.g., laptops, workstations, smartphones, palm tops, mobile phones, tablets, gaming systems, set-top boxes, wearable devices, etc.) that are capable of accessing network resources (e.g., they include software such as web browsers that are capable of accessing network resources). Users at the client devices 110A-I request network resources (e.g., HTML pages, images, word processing documents, PDF files, movie files, music files, or other computer files) through a client network application such as a web browser or other application (e.g., FTP client, SSH client, Telnet client, etc.).

The origin server 130 is a computing device that may serve and/or generate network resources (e.g., web pages, images, word processing documents, PDF files movie files, music files, or other computer files). An origin server 130 may also be another proxy server to the server that serves and/or generates network resources. Although not illustrated in FIG. 1, it should be understood that the network resources of the origin servers 130 may be stored separately from the device that responds to the requests.

The proxy server 120 is a computing device that is situated between the client devices 110A-I and the origin server 130 and provides many of the features of the service. Certain network traffic passes through the proxy server 120 (traffic sent from the client devices 110A-I and/or traffic sent from the origin servers 130 that is protected by the service). Based on at least in part on this traffic, the proxy server 120 provides a set of one or more services for the benefit of the customers and/or users of the client devices 110A-I.

While FIG. 1 illustrates a single proxy server 120, in some embodiments the service has multiple proxy servers that are geographically distributed. For example, in some embodiments, the service uses multiple point of presences (POPs). A POP is a collection of networking equipment (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP.

Although not illustrated in FIG. 1, in one embodiment the service includes multiple nodes (referred herein as "proxy service nodes"). Each proxy service node may include any of one or more proxy servers, one or more control servers, one or more DNS servers (e.g., one or more authoritative name servers), and one or more other pieces of networking equipment (e.g., one or more routers, switches, hubs, etc.). The proxy service node may be part of the same physical device or multiple physical devices. For example, the proxy server(s), control server(s), and DNS server(s) may be virtual instances running on the same physical device or may be separate physical devices. Each proxy service node may be part of a data center or a collocation site.

The owner of the proxy server 120 is typically different than the owner of the origin server 130. In addition, the proxy server 120 is not typically part of the local network of the origin web server 130. For example, the proxy server 120 may be outside of the local area network of the origin web server 130 and is typically not physically accessible by owners/administrators of the origin server 130.

The client devices 110A-I request DNS resolution when a domain name is used or requested by a local application and is not known (e.g., is not in a local DNS cache or the DNS record in its local cache has expired). For example, a client device makes a DNS request 150 to the DNS system 140 for an IP address for a domain. The DNS system 140 performs a recursive or iterative DNS process until the authoritative name server 142 returns an IP address. For those domains that are protected by the service, the IP address returned in the DNS response will be an IP address of the proxy server 120. For those domains not protected by the service, the IP address returned in the DNS response may be an IP address of the origin server 130.

Sometime after the DNS resolution is complete, the client device makes a request 154 (e.g., an HTTP GET request, an HTTP POST request, other HTTP request method, or other request for an action to be performed on an identified resource belonging to an origin server), which is transmitted to the proxy server 120. The proxy server 120 may analyze the request at operation 164 and determine a set of one or more request related actions to perform based on the results of the analyzing. Examples of request related actions that may be performed by the proxy server 120 include the proxy server 120 responding to the request locally by transmitting a response 162 (e.g., an HTTP response) to the client device 110, blocking the request 154 in addition to or in place of the response 162, reducing the speed at which content can be delivered to the client device 110, and transmitting the request to the origin server 130 on behalf of the client device 110 at operation 156.

The request 156 transmitted by the proxy server 120 to the origin server 130 on behalf of the client device 110 may be substantially similar to the original request 154 or it may be modified by the proxy server 120. For example, in some embodiments, the proxy server 120 removes content from the request if it determines that the content is a security threat to the origin server 130 while leaving the content that is not a security threat to be transmitted (e.g., if the request is an HTTP POST and the contents attempted to be posted contain a possible threat to the origin server). In other embodiments, the proxy server 120 modifies the content of the request to make the request less likely to harm to the origin server 130.

The origin server 130 respond to the request 156 as if the request was being transmitted from a client device directly. The response 158 (e.g., an HTTP response) may include the requested content, an error code indicating that the content cannot be found (e.g., an HTTP response status code 404 error), an error code indicating a problem with the origin server (e.g., an HTTP response status code 5XX error) or other response code.

After receiving the response 158, the proxy server 120 analyzes the response (at the analyzing response operation 166) and determines a set of one or more response related actions to perform based on the results of the analyzing response operation 166. The analyzing response operation 166 includes the proxy server 120 performing one or more of the following: determining the status of the response (e.g., whether it indicates an error code); determining whether the header of the response is malformed; determining whether the response poses an Internet security threat (e.g., whether the requested resource includes a virus, worm, or other vulnerability); determining whether the requested resource includes one or more elements that are to be excluded from being delivered to the visitor; determining whether to modify element(s) of the requested resource; determining whether to obfuscate elements of the requested resource (e.g., obfuscating an email address such that it will be displayed on the rendered page but obfuscated from the page source); determining whether to add content to the requested resource; and determining whether to cache the contents of the requested resource. Based on the results of the analyzing response operation 166, the proxy server 120 performs one or more appropriate response related actions, which may include generating the response 162 that may include the requested network resource that is transmitted to the requesting client device.

Figure 2A:
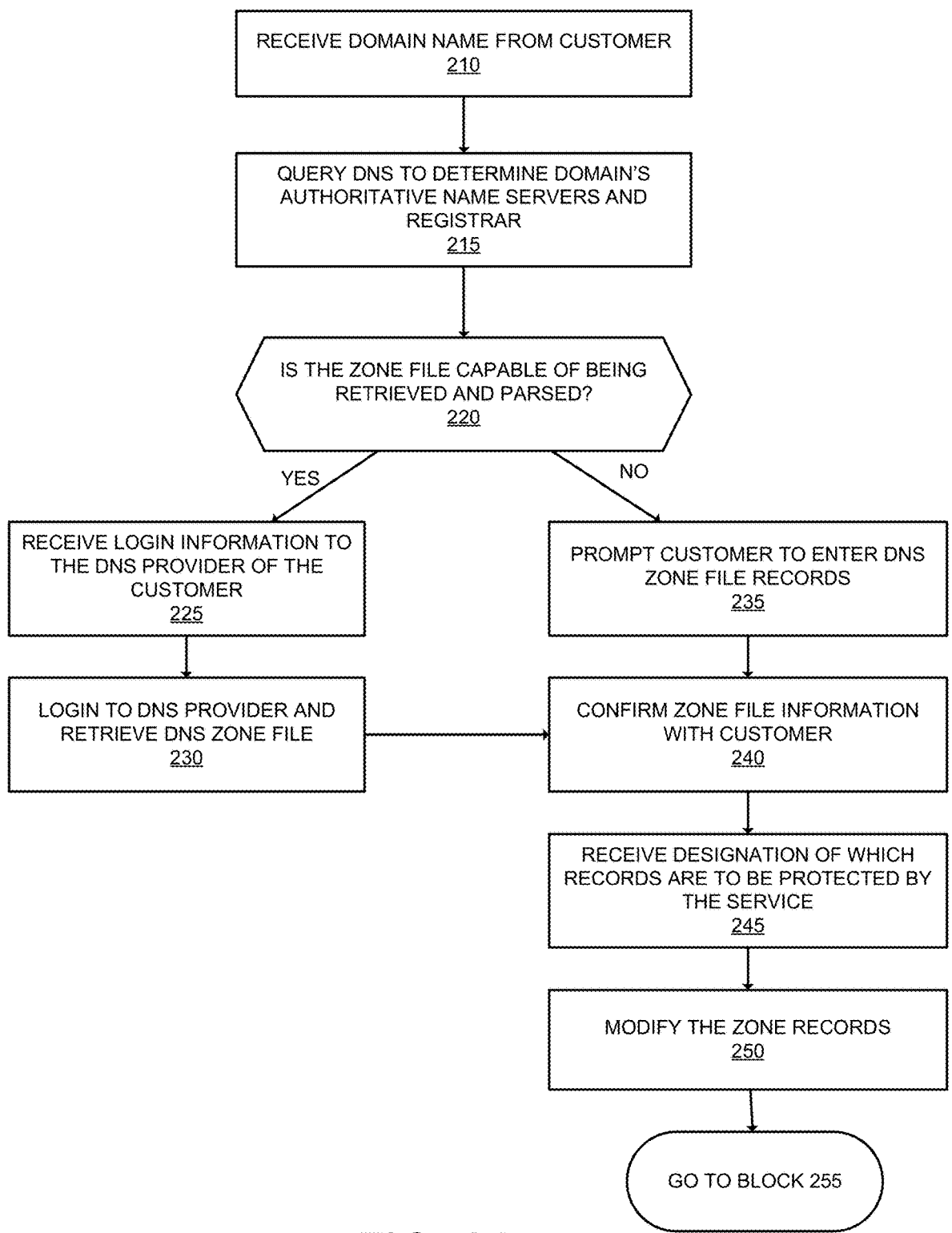
FIG. 2A is a flow diagram illustrating exemplary operations for a customer to use the service server to register for service according to one embodiment.
Figure 2B:
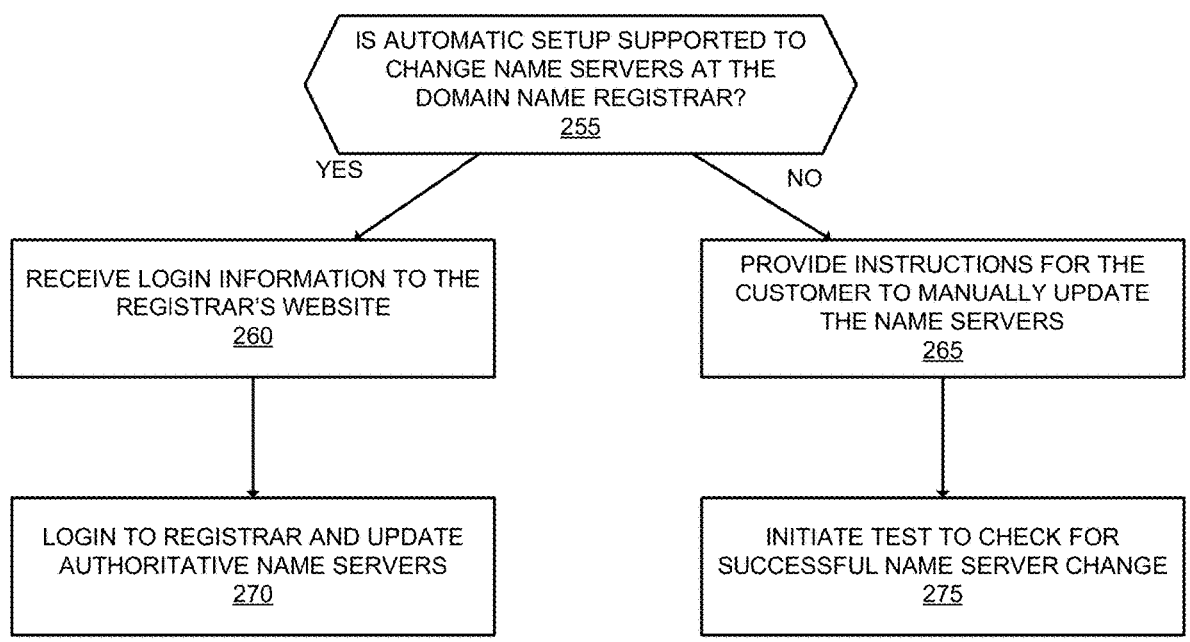
FIG. 2B is a flow diagram illustrating exemplary operations for a customer to use the service server to register for service according to one embodiment.

FIGS. 2A-B are flow diagrams illustrating exemplary operations for a customer to use the service server 125 to register for service according to one embodiment. The operations of FIGS. 2A-B will be described with reference to the service server 125; however it should be understood that the operations of FIG. 2A-B can be performed by embodiments other than those discussed with reference to the service server 125 and the service server 125 can perform operations different than those discussed with reference to the operations of FIG. 2A-B. In addition, the operations of FIG. 2A-B will be described with reference to the domain owner 135, which owns the domain example.com that is handled by the origin server 130.

Figure 5A:
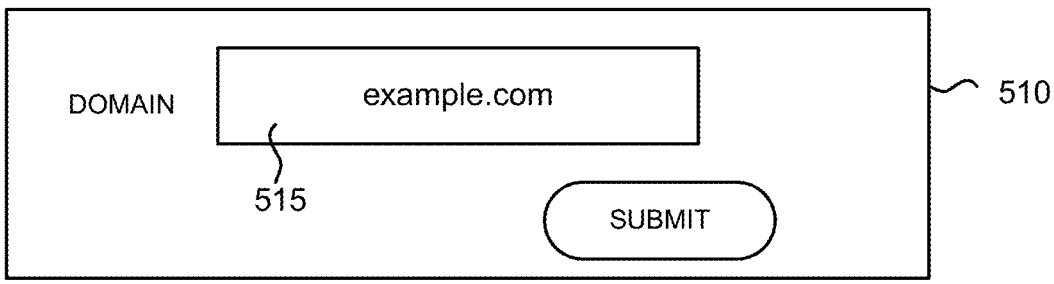
FIGS. 5A-C illustrate exemplary interfaces for customers to input domain related information according to one embodiment.

At block 210, the service server 125 receives the name of the domain (e.g., example.com) from the domain owner 135. For example, with reference to FIG. 5A, the service server 125 provides the domain input form 510 to allow the domain owner 135 to input their domain (e.g., example.com) into the domain field 515. The domain owner 135 submits the domain information by selecting the submit button. Flow moves from block 210 to block 215.

At block 215, the service server 125 queries the global DNS system to determine the authoritative name servers and domain name registrar for the domain (e.g., example.com). Flow then moves to block 220, where the service server 125 determines whether the current information in the DNS zone file for the domain is capable of being retrieved by the service server 125 in order to avoid the domain owner 135 from inputting the information. For example, some DNS providers may provide an API (Application Programming Interface) that can be used by the service server 125 to query for the information in the DNS zone file for the domain. The list of DNS providers that provide such an API and information of how to use the API is stored by the service server 125. As another example, the service server 125 may simulate a human user logging into the DNS provider's website to determine the information in the DNS zone file. In such a case, the service server 125 accesses a map of the DNS provider's website that has been pre-recorded by an operator of the service and stored by the service server 125. The map includes the web page on which the user login information is entered, the particular fields into which the login information is entered, the page or pages on which the zone information is displayed, the structure of those pages, and any links or URLs to request additional pieces of the zone file from the DNS provider. If the DNS zone file is capable of being retrieved, then flow moves to block 225, otherwise flow moves to block 235.

Figure 5B:
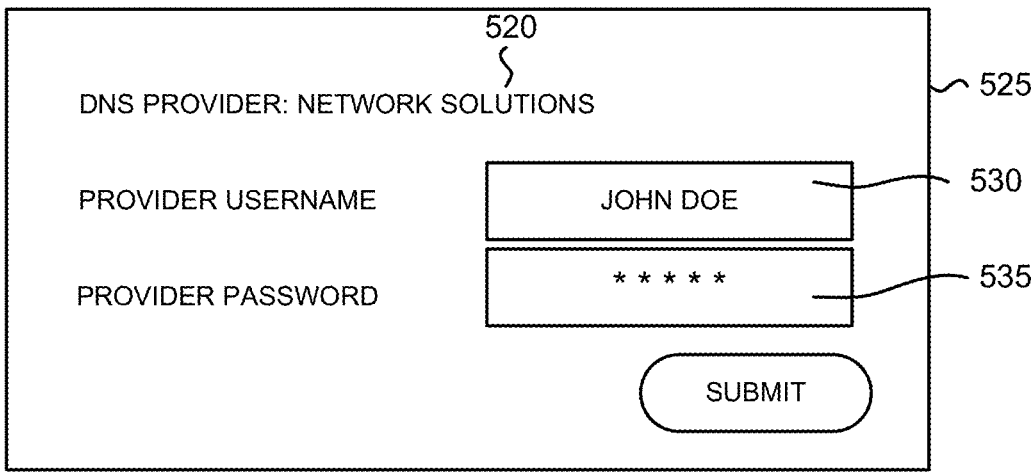

At block 225, the service server 125 receives login information (e.g., username and password) to the DNS provider's website from the domain owner 135. For example, with reference to FIG. 5B, the service server 125 provides the DNS provider login information input form 510 to allow the domain owner 135 to input their username and password for the DNS provider 515 into the username field 520 and password field 525 respectively. The domain owner 135 submits the login information to the service server 125 by selecting the submit button. Flow moves from block 225 to block 230.

At block 230, the service server 125 logs into the DNS provider website using the login information and retrieves the information from the DNS zone file record for the domain. For example, if the DNS provider provides an API for querying the information in the DNS zone file for the domain, the service server 125 uses that API to query for the zone file information. If there is not such an API, the registrations server 125 queries the DNS provider via a service server-controlled agent (e.g., using HTTP or HTTPS protocols). For example, the service server 125 may request the login page, enter any required login information, submit the login page, request one or more pages where the zone file is displayed, store the response from those pages, scan the pages based on the predefined map to retrieve the zone information, and logout of the DNS provider. Flow moves from block 230 to block 240.

Figure 3:
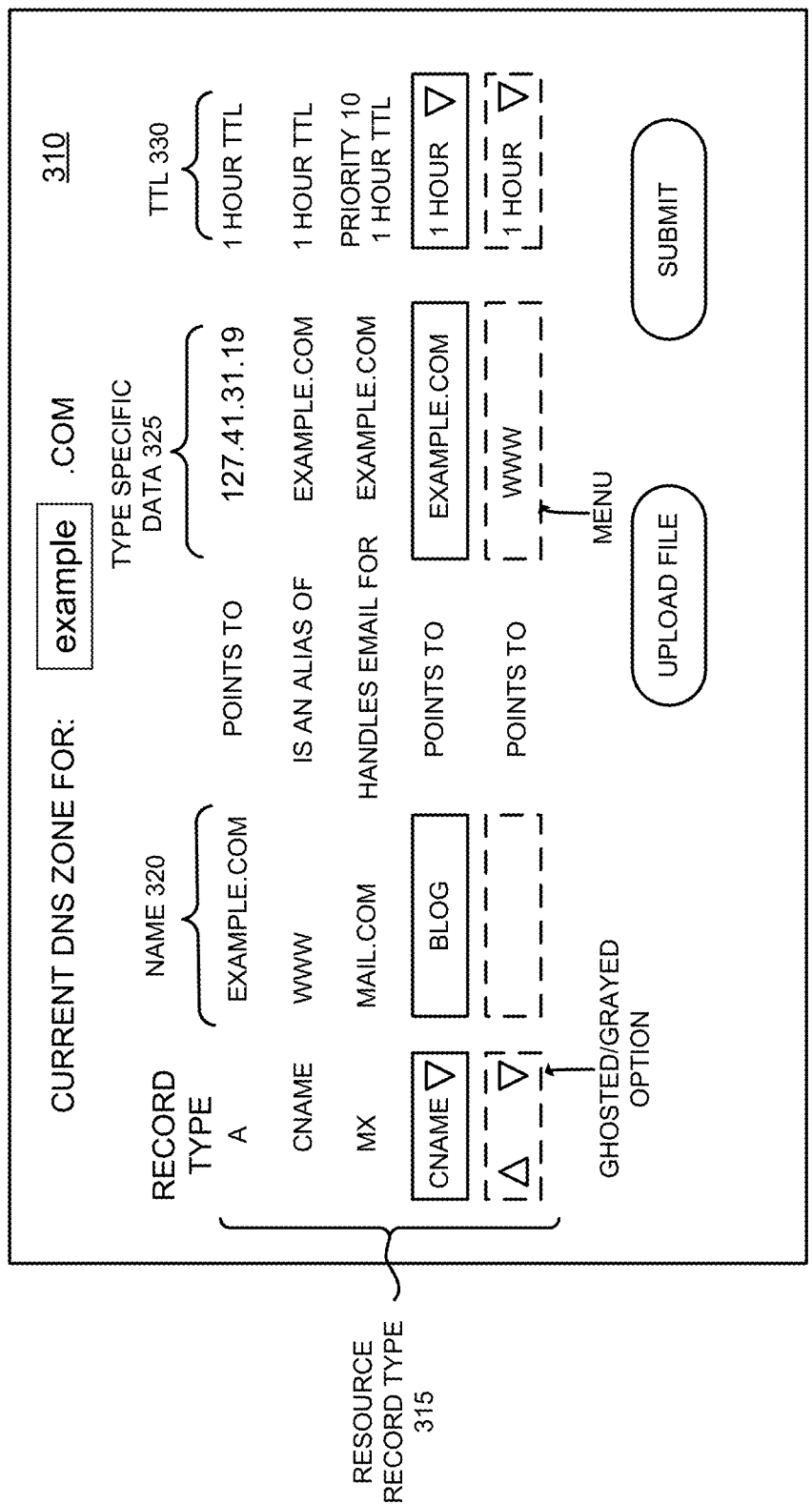
FIG. 3 illustrates an exemplary interface provided by the service server to allow domain owners to enter the information for the DNS zone file records according to an embodiment.

Referring back to block 235 (the information in the zone file is not capable of being retrieved by the service server 125), the service server 125 prompts the domain owner 135 to enter the information for the DNS zone file record for the domain. For example, FIG. 3 illustrates an exemplary interface provided by the service server 125 to allow domain owners to enter the information for the DNS zone file records. As illustrated in FIG. 3, the interface 310 allows domain owners to indicate for each record a resource record type 315 (e.g., A, CNAME, NS, MX, LOC, etc.), a name 320, resource record type specific data 325, and a time-to-live (TTL) value 330. Flow moves from block 235 to block 240. The service server 125 may also provide a tool to assist the domain owner 135 in manually entering in the information to prevent mistakes.

Figure 4:
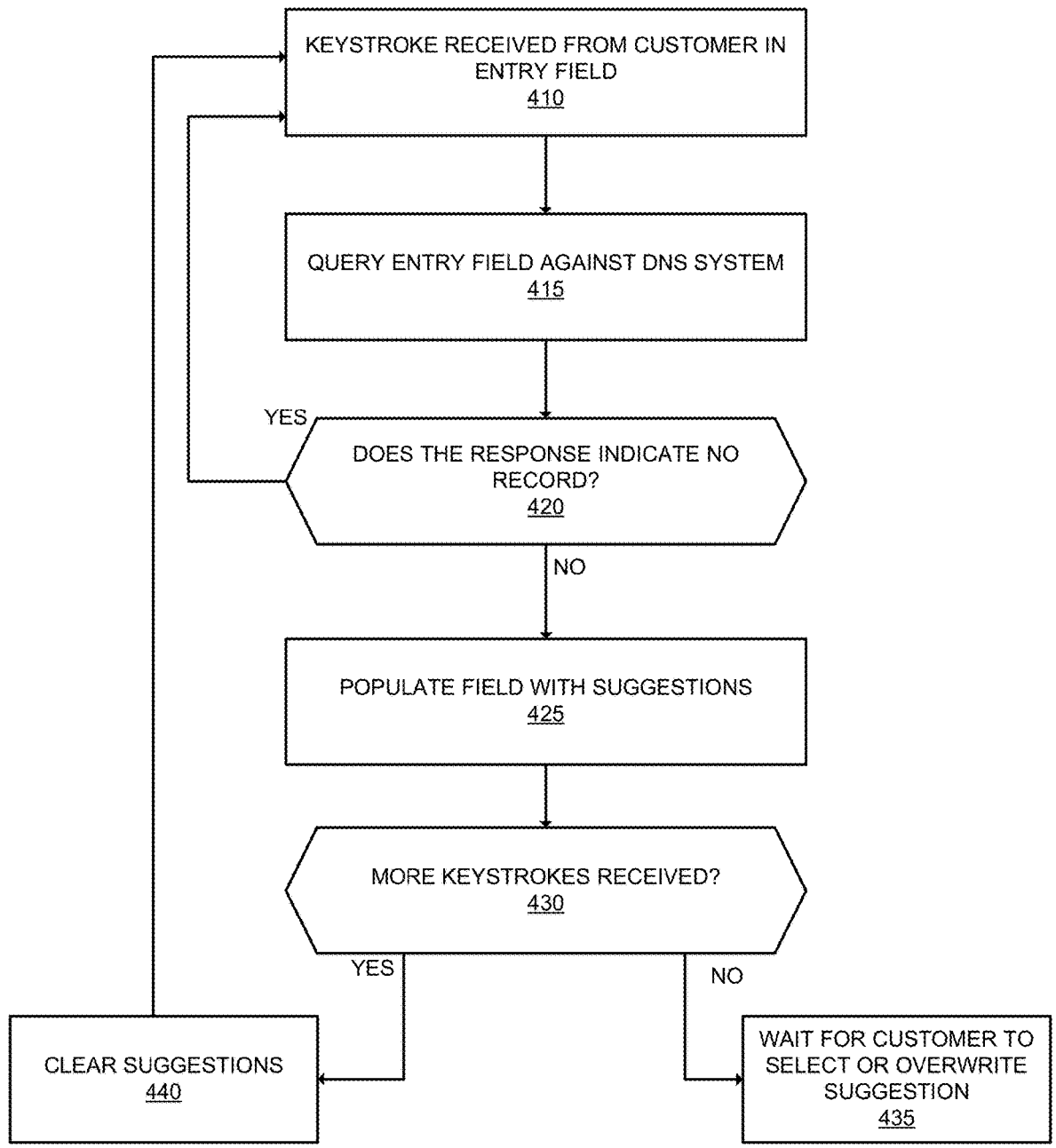
FIG. 4 is a flow diagram illustrating exemplary operations performed by the service server to assist domain owners in manually entering DNS zone file information according to one embodiment.

FIG. 4 is a flow diagram illustrating exemplary operations performed by the service server 125 to assist domain owners in manually entering DNS zone file information according to one embodiment. At block 410, the service server 125 receives a keystroke input from the domain owner 135 for one of the resource record type fields. For example, with reference to FIG. 3, the domain owner 135 enters at least one keystroke in one of the fields 315, 320 and 325. Next, at block 415, the service server 125 queries the global DNS system for the keystroke input to determine if there is a matching record. Flow then moves to block 420, where the service server 125 determines whether the global DNS system indicates that there is no record for the queried entry. If there is no record, flow then moves back to block 410 where the domain owner 135 may enter more keystroke input. If there is at least one matching record, then flow moves to block 425 where the service server populates the field with one or more suggestions. Flow then moves to block 430, where if the service server 125 receives another keystroke from the domain owner 135, then flow moves to block 435 where the suggestion(s) are cleared and flow moves back to 410. If more keystrokes are not entered by the domain owner 135, then flow moves to block 435 where the service server 125 waits for the domain owner 135 to select one of the suggests or add more keystrokes.

Referring back to FIG. 2A, at block 240, the service server 125 displays the zone file information to the domain owner 135 to allow the domain owner 135 to confirm its accuracy. The domain owner 135 may also edit the information if it is not accurate. Flow then moves to block 245 where the service server 125 receives from the domain owner 135 designation of which records in the zone file are to be protected by the service. For example, the domain owner 135 indicates at least that the address record (e.g., record type A or AAAA) of the domain (e.g., example.com) is protected by the service. Flow moves from block 245 to block 250.

At block 250, the service server 125 modifies the DNS zone record(s) designated by the domain owner 135 and the DNS authoritative name servers for the domain to that of the service. For example, the address pointing to the resource record type A (or AAAA) of the domain (e.g., example.com) is changed to an IP address of a proxy server such as the proxy server 120, and the authoritative name servers are changed to authoritative name servers of the service (e.g., including the authoritative name server 142). The proxy server 120 may be one of multiple proxy servers in the service. The service server 125 may choose one of the proxy servers in a number of ways (e.g., based on current and/or expected load, based on location, round robin, etc.). Flow moves from block 250 to block 255.

At block 255, the service server 125 determines whether it supports an automatic setup procedure to change the authoritative name servers at the domain name registrar for the domain. For example, some domain name registrars may provide an API that can be used by the service server to change the authoritative name servers for the domain. The list of domain name registrars that provide such an API and information of how to use the API is stored by the service server 125. As another example, the service server 125 may simulate a human user logging into the domain name registrar's website to change the authoritative name servers for the domain. In such a case, the service server 125 accesses a map of the domain name registrar's website that has been pre-recorded by an operator of the service and stored by the service server 125. The map includes the login page, any fields where the login information is entered, the path to the page on which the authoritative name servers are changed, the fields that must be updated for those authoritative name servers to be changed, and any interface provided to delete name servers. If the service server supports automatic changing of the authoritative name servers at the domain name registrar for the domain, the flow moves to block 260; otherwise flow moves to block 265.

Figure 5C:
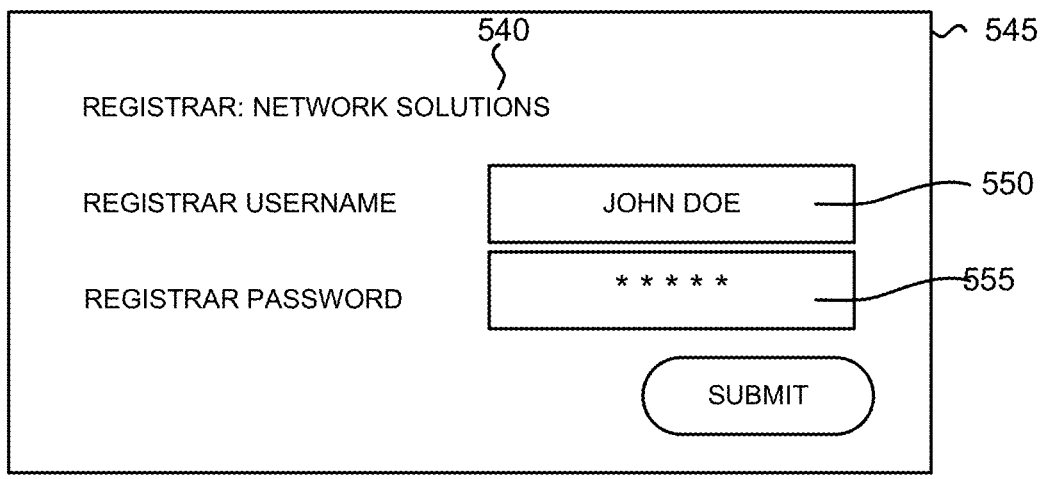

At block 260, the service server 125 receives login information (e.g., username and password) to the domain name registrar's website from the domain owner 135. For example, with reference to FIG. 5C, the service server 125 provides the domain name registrar login information input form 510 to allow the domain owner 135 to input their username and password for the domain name registrar 515 into the username field 520 and password field 525 respectively. The domain owner 135 submits the login information to the service server 125 by selecting the submit button. Flow moves from block 225 to block 230.

At block 230, the service server 125 logs into the registrar's website and updates the authoritative name servers to that of the service. Flow then moves to block 275 where the service server 125 initiates a test to check to determine whether the authoritative name servers have been successfully changed. For example, the service server queries the global DNS system (e.g., with a dig operation, who is operation, etc.) for the domain to confirm that the authoritative name servers have been successfully changed. It should be understood that it may take some amount of time for the change of the authoritative name server to propagate throughout the global DNS system.

In another embodiment, the customer uploads a file representing the DNS zone file (e.g., a DNS bind file, a spreadsheet, or other format that designates the subdomains, record types, TTLs, and the records they resolve to). In another embodiment, the initial zone data is gathered from data retrieved from a recursive DNS provider. For example, for a particular domain, the recursive DNS provider may provide information indicating all of the subdomains that they have made a query for the domain.

Figure 6:
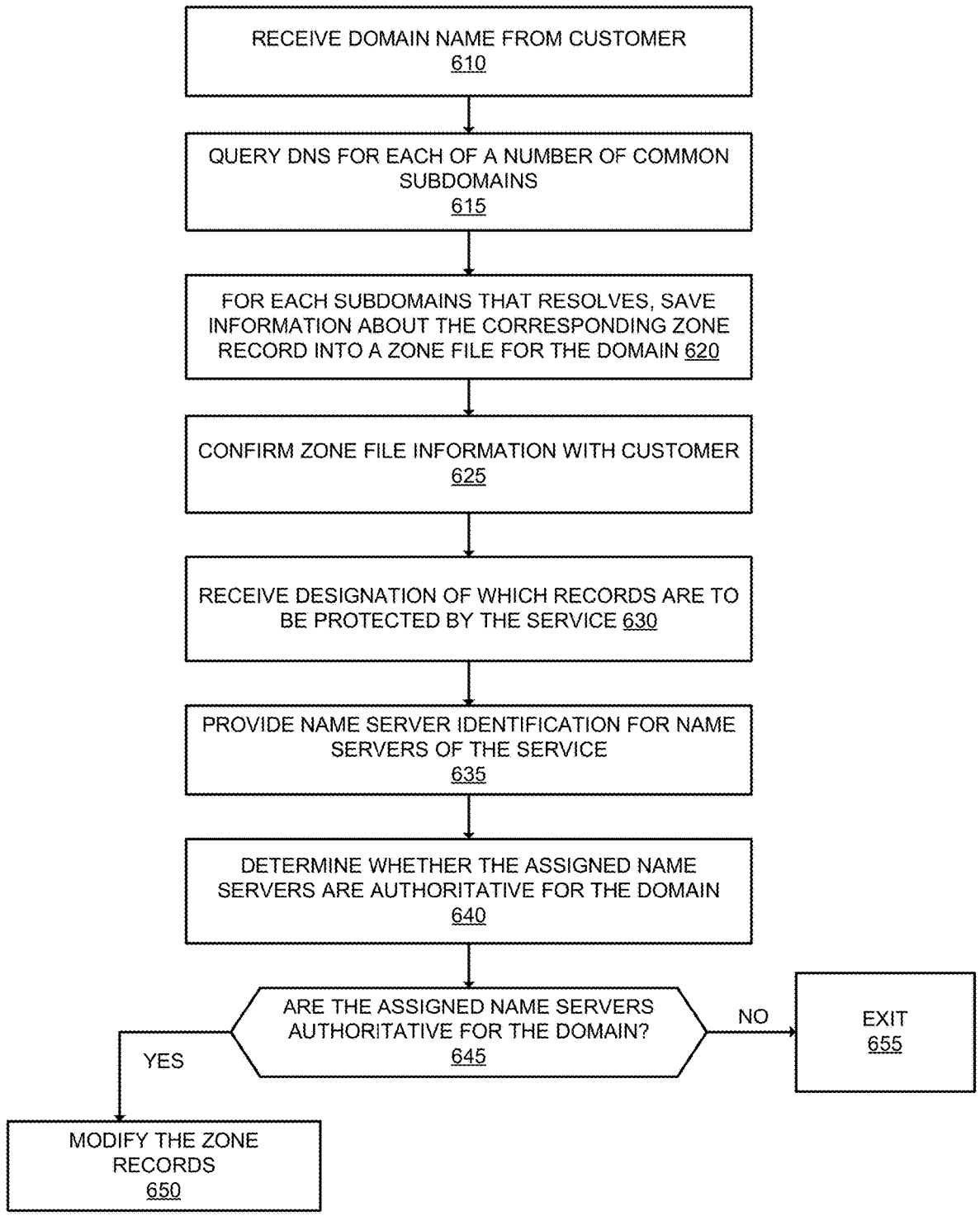
FIG. 6 is a flow diagram illustrating exemplary operations for registering for service where the initial zone data is gathered by making DNS queries for a number of common subdomains according to another embodiment.
Figure 7:
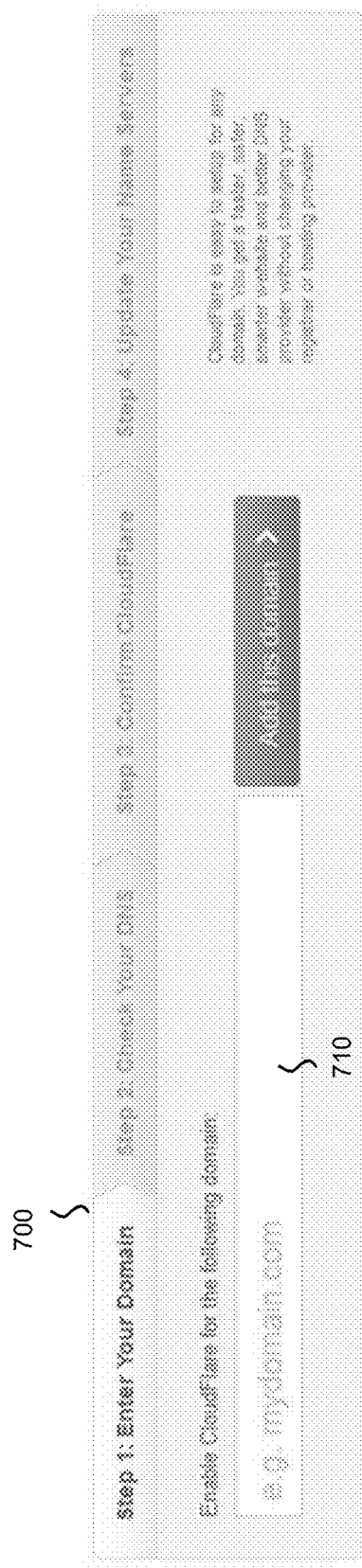
FIG. 7 illustrates an exemplary domain input form for customers to input their domain during a registration process according to one embodiment.

In another embodiment, the initial zone data for a domain is gathered by making DNS queries for a number of common subdomains to see what resolves. FIG. 6 is a flow diagram illustrating exemplary operations for registering for service where the initial zone data is gathered by making DNS queries for a number of common subdomains according to another embodiment. The operations of FIG. 6 will be described with reference to the service server 125; however it should be understood that the operations of FIG. 6 can be performed by embodiments other than those discussed with reference to the service server 125 and the service server 125 can perform operations different than those discussed with reference to the operations of FIG. 6. In addition, the operations of FIG. 6 will be described with reference to the domain owner 135, which owns the domain example.com and is hosted by the origin server 130A. In addition, FIG. 6 will be described with reference to the exemplary embodiments of FIGS. 7-11. However, it should be understood that the operations of FIG. 6 can be performed by embodiments other than those discussed with reference to FIGS. 7-11, and the embodiments discussed with reference to FIGS. 7-11 can perform operations different than those discussed with reference to FIG. 6.

At operation 610, the service server 125 receives the name of the domain (e.g., example.com) from the domain owner 135. For example, with reference to FIG. 7, the service server 125 provides the domain input form 700 to allow the domain owner 135 to input their domain (e.g., example.com) into the domain field 710. The domain owner 135 submits the domain information by selecting the add domain button on the domain input form 700. Flow moves from block 610 to block 615.

At block 615, the service server 125 queries, or causes a query to be issued to the DNS system 140 for each of a number of common subdomains (e.g., www.example.com, blog.example.com, web.example.com, mail.example.com, ftp.example.com, etc.). For example, in one embodiment, the service server 125 stores a list of subdomains that are ranked into the likelihood that they will appear in a zone for a domain. The subdomains may be tested sequentially or in parallel.

In one embodiment, the number of DNS queries per second can be limited to not exceed a certain number of queries per second in order to not trigger anti-abuse systems with the DNS provider. The query period can either run through the entire list of subdomains testing all of them and finish when completing, or it can run through only a partial list and finish when a certain amount of time has passed (e.g., query as many possible in 1 minute). As new zones are added, the service server 125 can continue to adjust the order of the tested subdomains (e.g., determine what percentage of zones contain a certain subdomain then order them based on those percentages). In this way, the list of common subdomains becomes more accurate and efficient. Third party information, such as information from Recursive DNS Providers, can also be used in order to create the ranking list.

Figure 8:
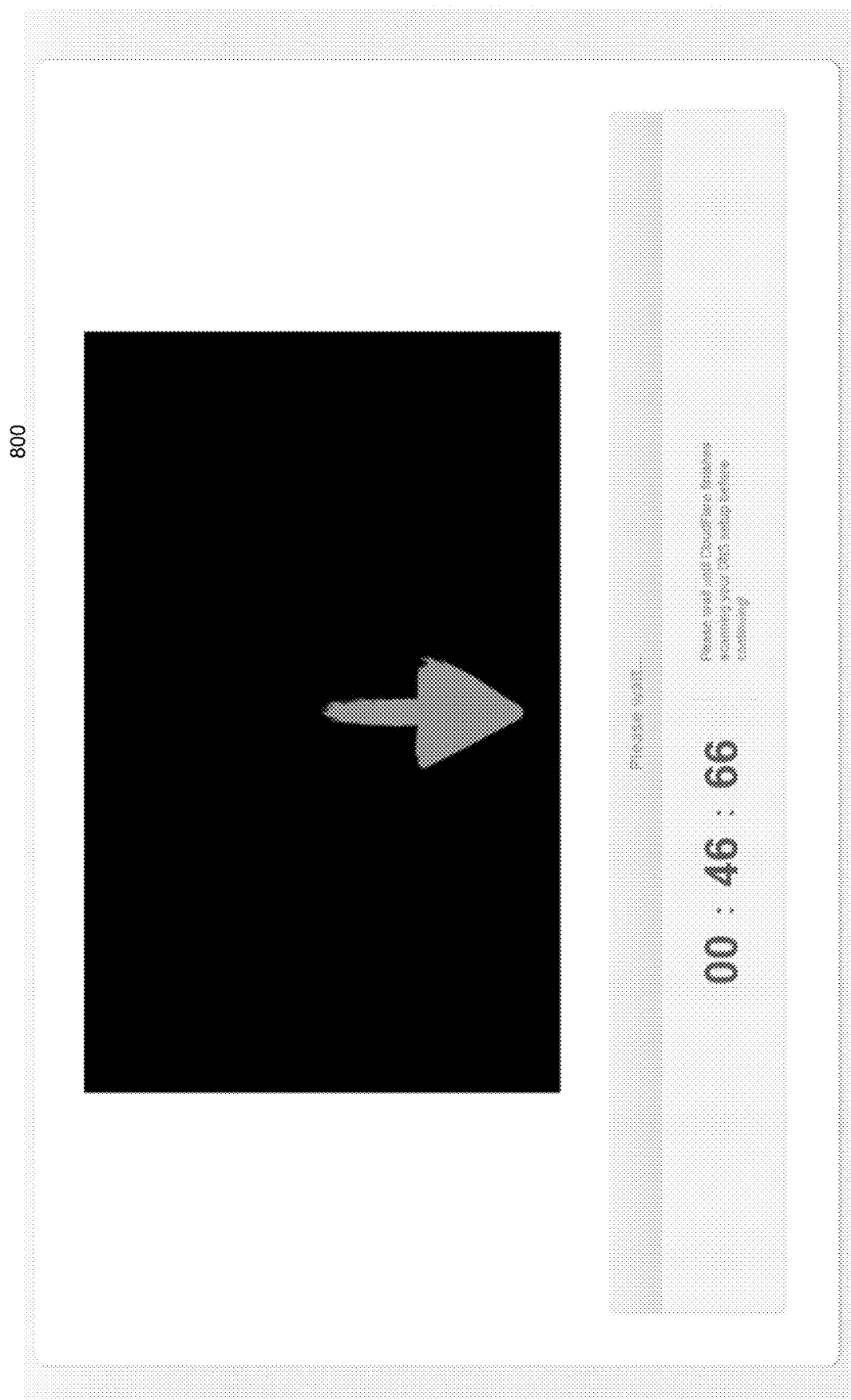
FIG. 8 illustrates a registration screen in which the service server is querying DNS for a number subdomains of the domain according to one embodiment.

FIG. 8 illustrates a screen 800 in which the service server 125 is testing the number of subdomains according to one embodiment. As illustrated in FIG. 8, the screen 800 includes a timer during which the DNS queries are made.

Flow moves from operation 615 to operation 620. At operation 620, for each of the subdomains tested that resolves, the service server 125 saves information about the record into a zone file for the domain (e.g., the record type, the TTL value, and the record).

Figure 9A:
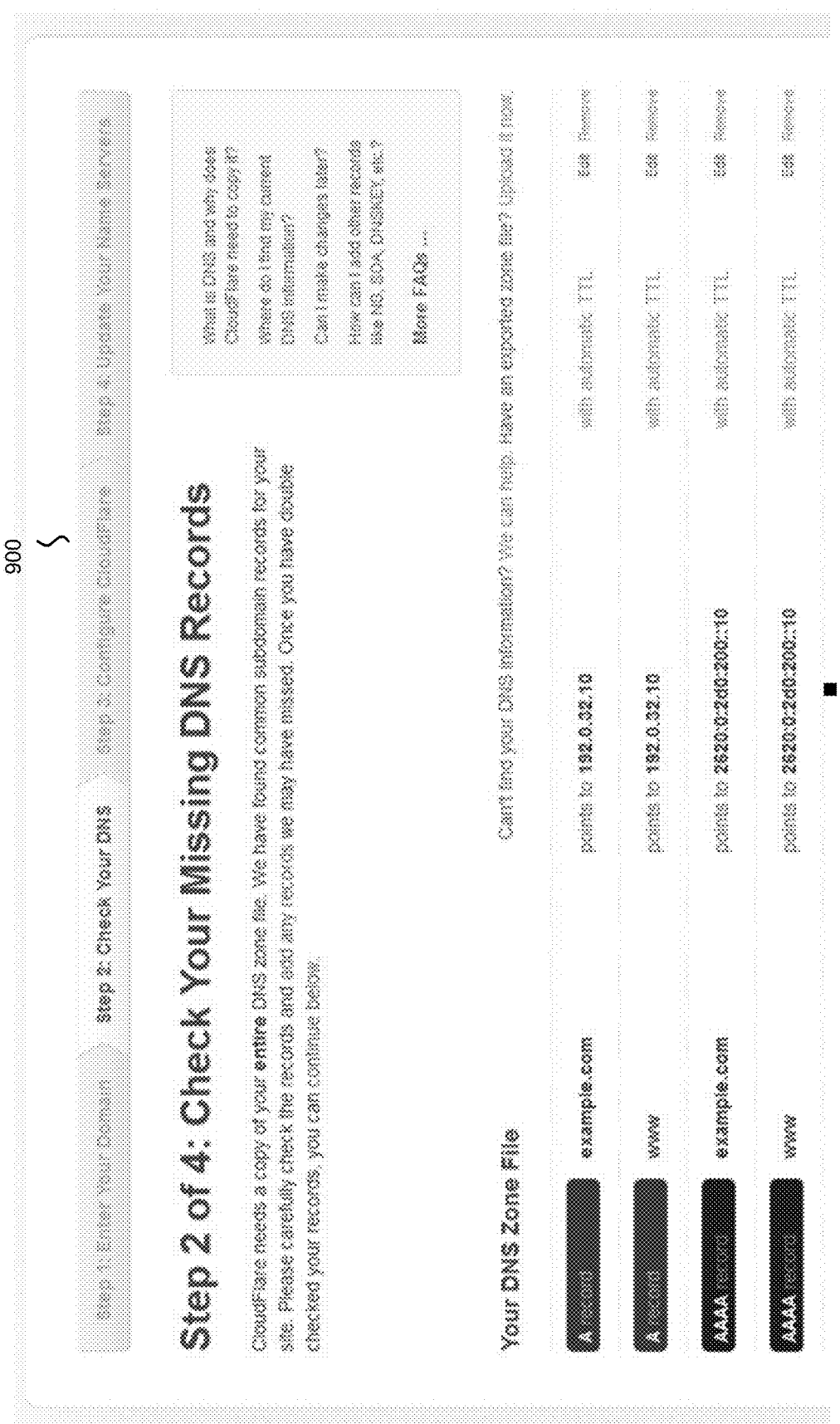
FIGS. 9A-B illustrate an exemplary zone file confirmation screen that allows customers to confirm resource records, add resource records, modify resource records, and/or delete resource records according to one embodiment.
Figure 9B:
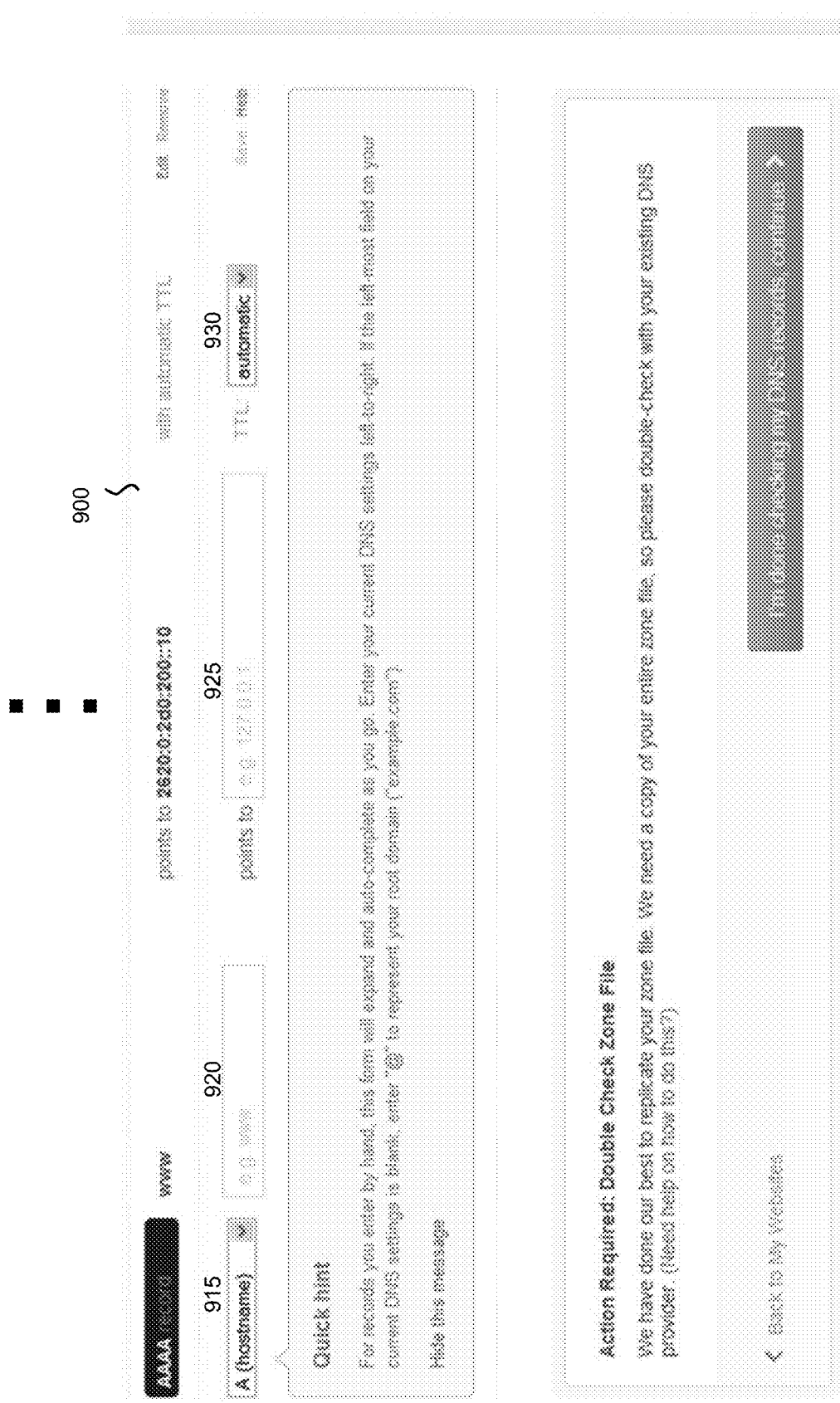

Flow then moves to operation 625 and the service server 125 confirms the zone file information with the customer. For example, FIGS. 9A-B illustrate a zone file record screen 900 that allows customers to confirm resource records, add resource records, modify resource records, and/or delete resource records. The zone file record screen 900 includes the records determined from the testing of the subdomains in operation 615. The zone file record screen 900 also allows the customer to provide records that were not found during the testing of the common subdomains. For example, the zone file record screen 900 allows domain owners to indicate for each record a resource record type 915 (e.g., A, CNAME, MX, TXT, SPF, AAAA, NS, SRV, LOC), a name 920, resource record type specific data 925, and a TTL value 930. The service server 125 may also provide a tool to assist the customer in manually entering in the information to prevent mistakes as described with reference to FIG. 4.

Figure 10A:
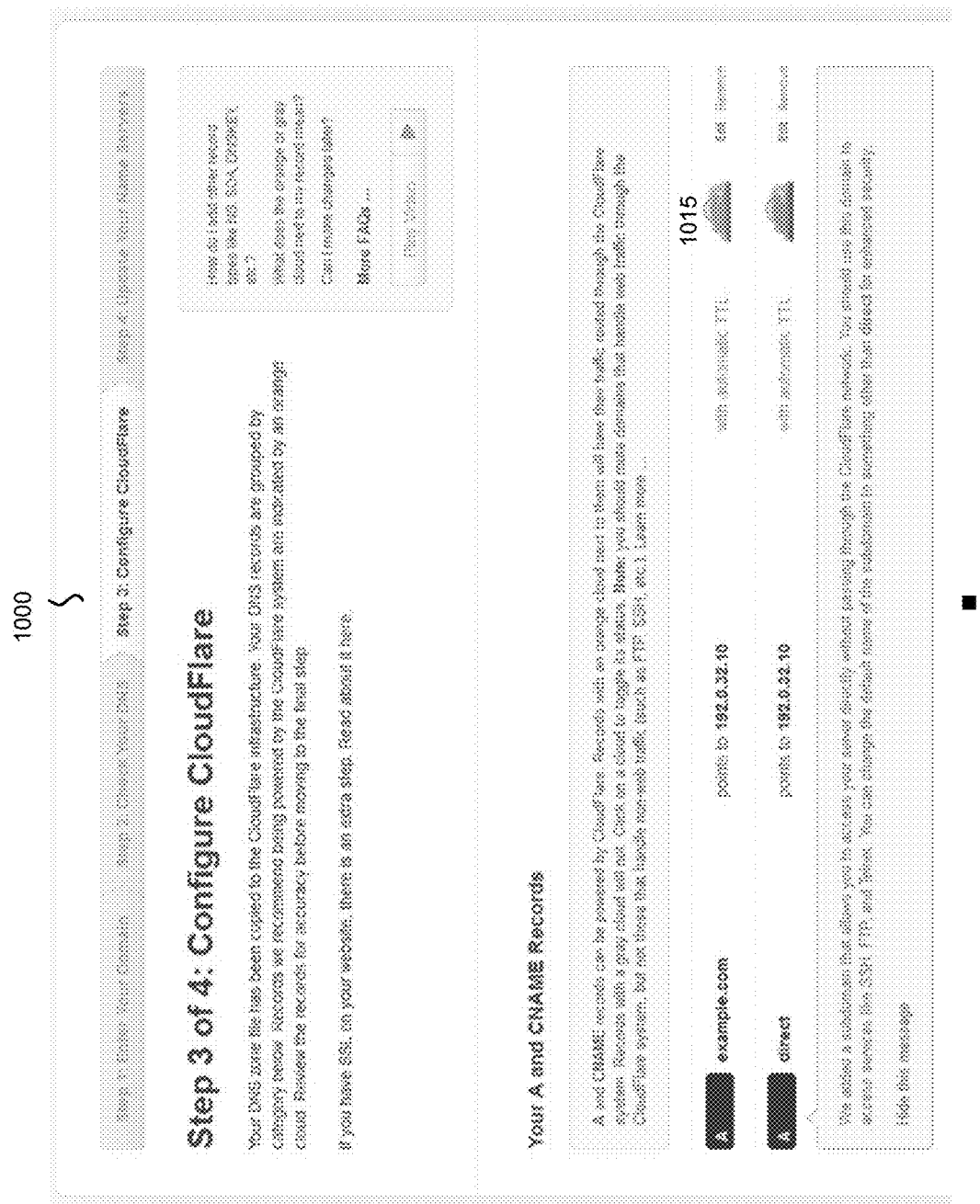
Figure 10B:
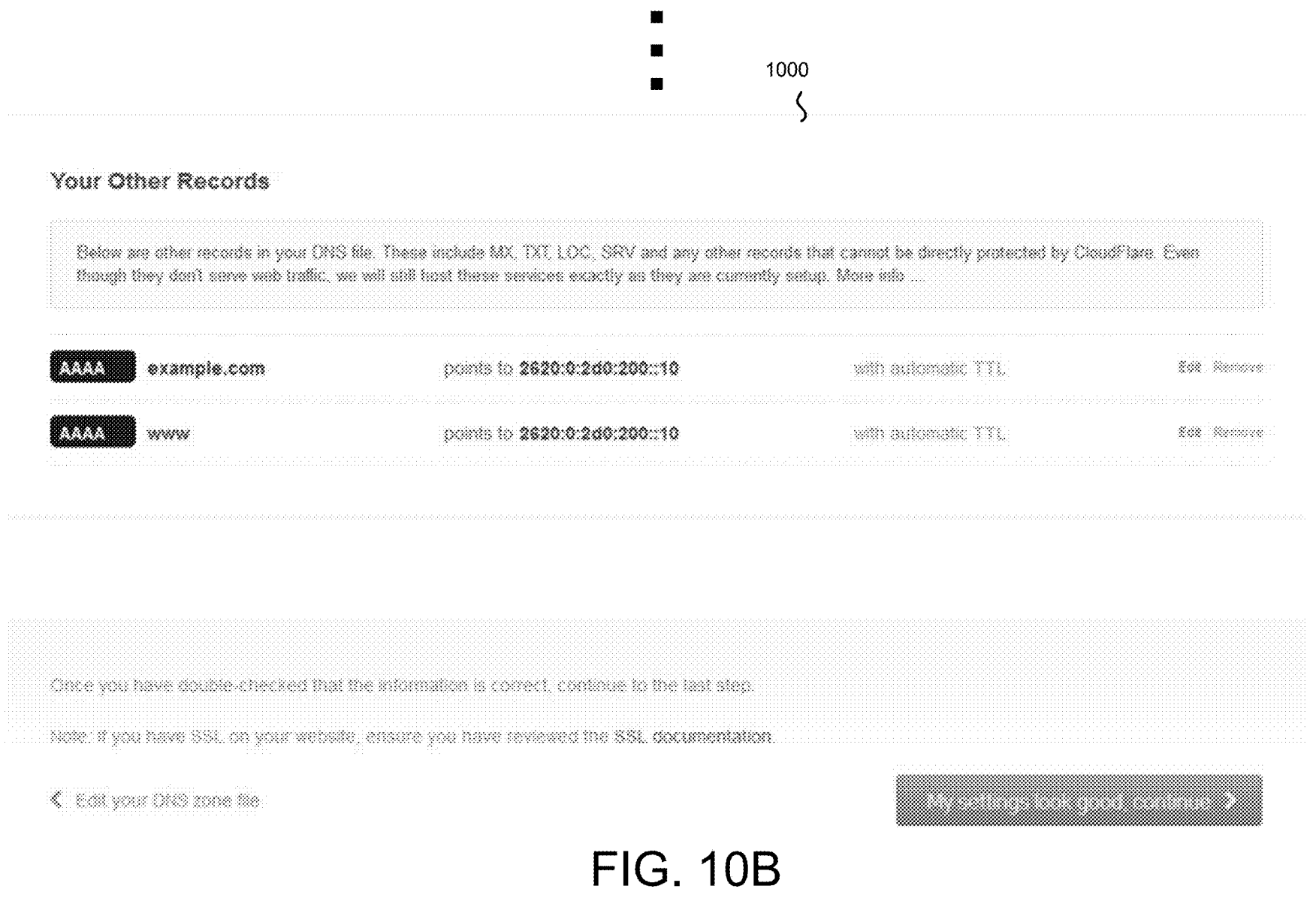

Flow moves from operation 625 to operation 630 where the service server 125 receives designation of which records are to be protected by the service. For example, FIGS. 10A-B illustrate a configuration screen 1000 that allows customers to configure certain one(s) of their subdomains (e.g., example.com) to be protected by the service (e.g., point to the proxy server 120). For example, the configuration screen 1000 includes the protection field 1015 that can be used by customers to indicate which one(s) of their records is to be protected by the service. In one embodiment, the service server 125 stores a list of subdomains that it knows are valid to be protected and default those records as being protected (e.g., "www," "blog," "web", etc.). In another embodiment, the service server 125 stores a list of subdomains that it knows should not be protected by the service and default those to be not protected by the service while making the other records protected by the service (e.g., "database", "mail", or any MX records). The customer may override the defaults.

Figure 11:
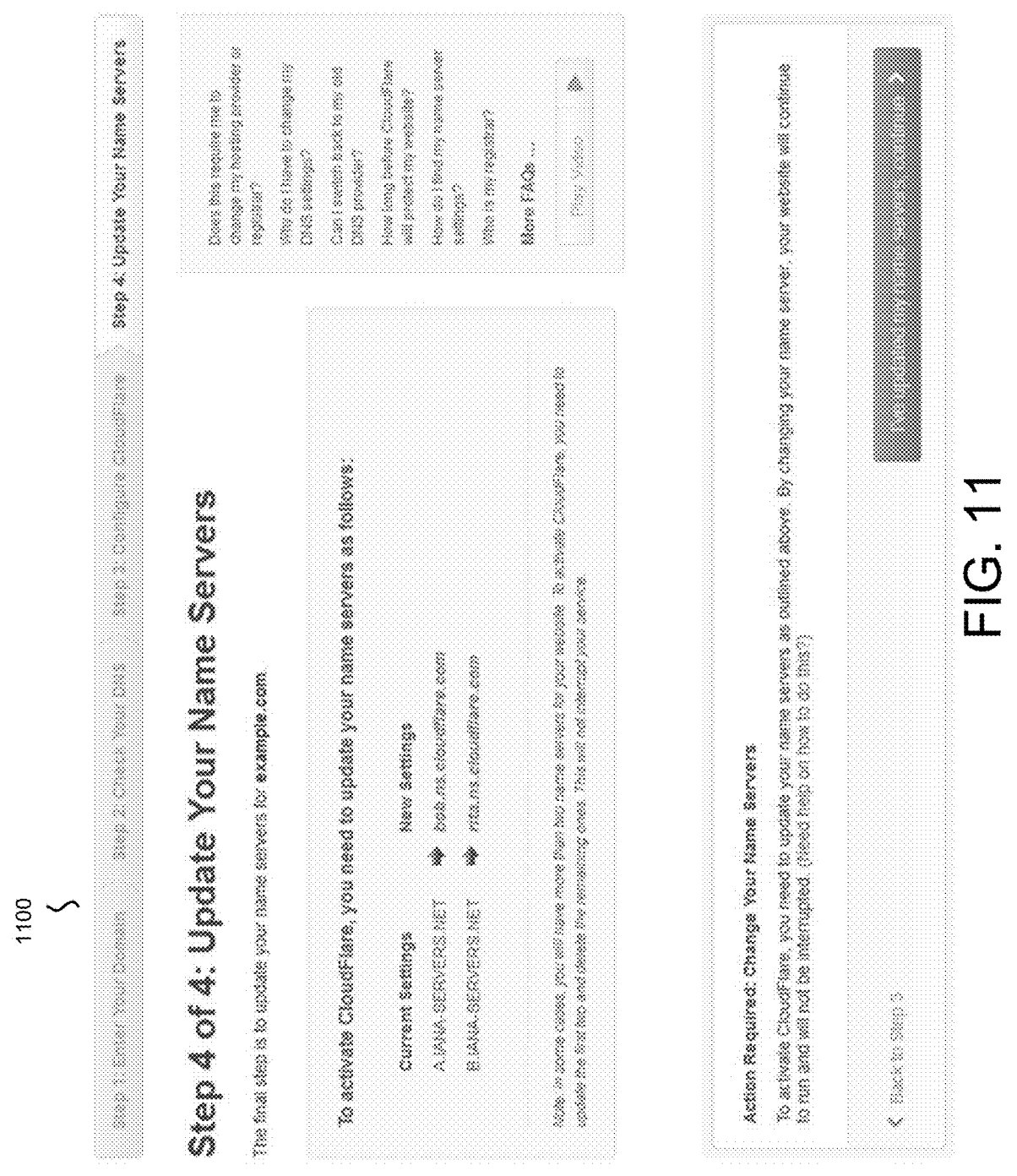

Flow moves from operation 630 to operation 635 where the service server 125 provides name server identification for name servers of the service. For example, FIG. 11 illustrates a name server configuration screen 1100 that provides a number of name server addresses of the service. A customer changes their name servers to point to the name servers given to demonstrate that the customer has the authority to change the DNS records. In one embodiment, the service server 125 provides multiple subdomains for name servers that include a unique code in order to ensure that two registrants for the same domain do not register the same code. For example, if Alice and Bob both claim to register example.com, Alice could be provided the name servers ns21.systemdns.com and ns39.systemdns.com. Bob could be provided the name servers ns14.systemdns.com and ns87.systemdns.com. The system could periodically check what name servers are authoritative for example.com, or could check when the system first begins to receive traffic for example.com. Upon doing so, if ns21 and ns39 are set as the authoritative name servers for example.com then the system would know Alice's settings are authoritative and could propagate them. On the other hand, if ns14 and ns87 were authoritative name servers for example.com then the system would know Bob's records were authoritative and would propagate them. In one embodiment, a single domain or combination of domains used as unique name servers for multiple registrants can be used. For example, a single name server with a code (e.g., 1257799302.systemdns.com) or multiple domains (e.g., systemdns.com and dnsauth.com).

In an alternative embodiment, in order to verify the authority of the customer to change the DNS records for the domain, the service server 125 queries the customer to add a unique record to their existing DNS file. This record could be of any valid DNS record type. In one example, a customer could add a TXT record with a unique string of characters. The system could check for the presence of this TXT record and, if the string of characters matched, designate the customer who was issued that string of characters in association with that domain as authoritative for the domain. Once that happened, the customer's settings could be propagated any future changes to those settings trusted.

Flow moves from operation 635 to operation 640 where the service server 125 determines whether the name servers provided in operation 635 have been modified to be authoritative for the domain. In one embodiment, the service server 125 periodically checks whether the name servers provided in operation 635 are authoritative for the domain. In other embodiments, the customer indicates when the name servers assigned by the service are authoritative for the domain. For example, the service server 125 may provide an interface for the customer to indicate that the assigned name servers are authoritative for the domain (e.g., through a button, etc.). In other embodiments the customer may call a telephone number, send a text message, or send an email to indicate that the assigned name servers are authoritative for the domain. Regardless of the way, after receiving an indication from the customer that the assigned name servers have been changed to be authoritative for the domain, the service server 125 (or other server of the service) checks whether the assigned name servers are indeed authoritative for the domain. If the assigned name servers have been changed to be authoritative for the domain, then flow moves to operation (determined at operation 645), then flow moves to operation 650, otherwise flow moves to operation 655 and the operation exits (the customer did not prove that they had authority to change the DNS records).

At operation 650, the service server 125 modifies (or causes to be modified) those DNS zone record(s) that are designated to be protected by the service. For example, the address pointing to the resource record type A (or AAAA) of the domain (e.g., example.com) is changed to an IP address of a proxy server such as the proxy server 120. In one embodiment, the zone file records 144 (including the updated zone file records) are stored by the name server 142. The proxy server 120 may be one of multiple proxy servers in the service. The service server 125 may choose one of the proxy servers in a number of ways (e.g., based on current and/or expected load, based on location, round robin, etc.).

After network configuration has been modified for a particular domain, the service server 125 checks the configuration and determines if there is any flaw in the configuration that may cause information about the origin server (e.g., the IP address of the origin server) to be leaked. Upon finding a flaw in the configuration, the service may notify the origin server and/or the operator of the origin server that the information may be leaked.

Figure 12:
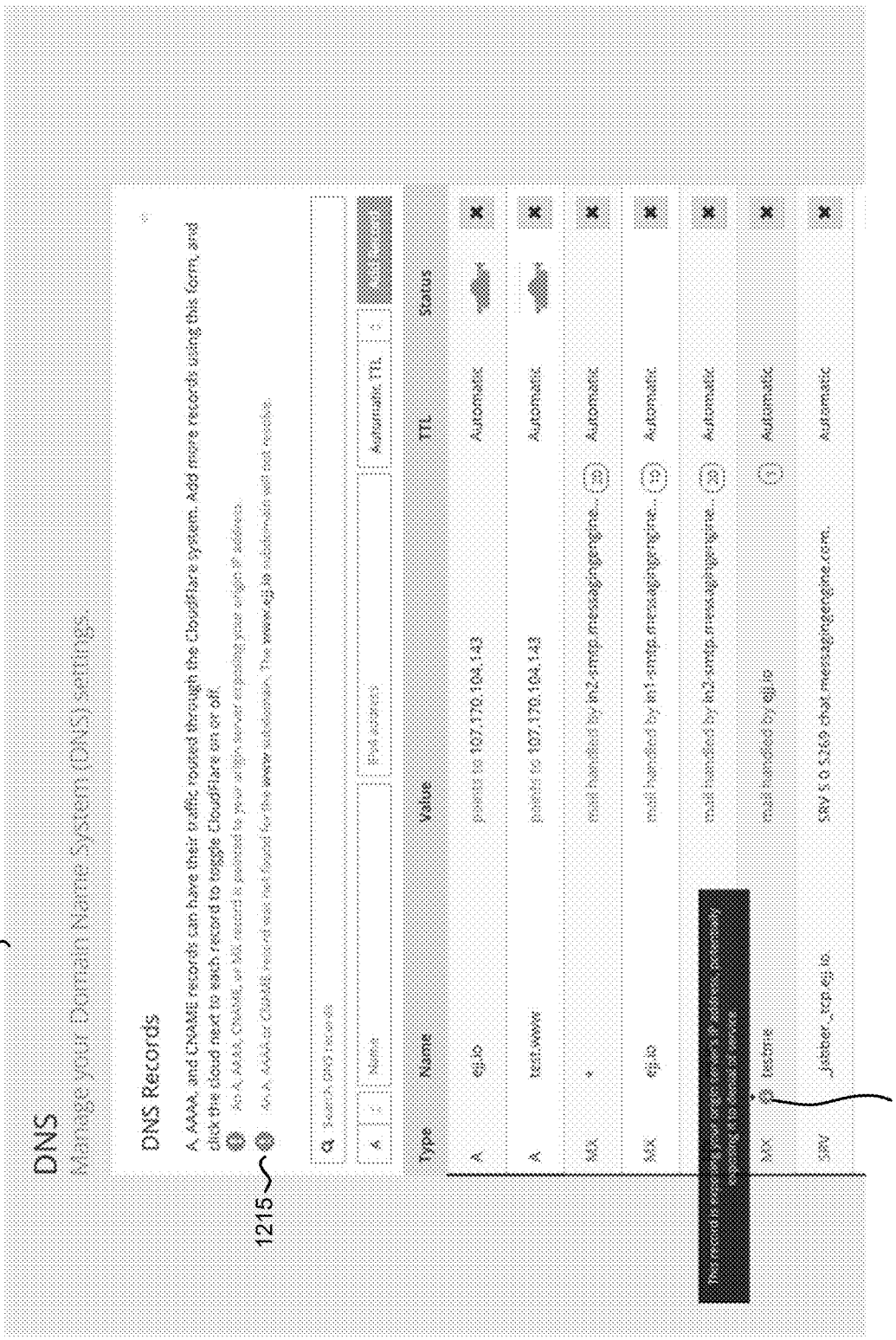
FIG. 12 illustrates an exemplary configuration screen 1200 that notifies a customer if their configuration is potentially leaking their origin IP address according to an embodiment.

For example, in an embodiment, the service server 125 compares the DNS configurations of unprotected assets (e.g., domains that will not point to a proxy server of the service) and protected assets (e.g., domains that point to a proxy server of the service). A record that is not protected by the service and is also referring to a record that is protected by the service is considered to be leaking the origin IP address. For instance, FIG. 12 illustrates an exemplary configuration screen 1200 that notifies a customer if their configuration is potentially leaking their origin IP address. For instance, the A record "ejj.io" is pointing to an IP address of a proxy server of the service and is therefore a protected asset. That is, a DNS request for "ejj.io" will return an IP address of the proxy server of the service and therefore traffic directed to the domain "ejj.io" will be received at a proxy server of the service. The MX record "testme", which is not protected by the service, has a value where the mail is handled by the domain "ejj.io" (a protected asset). Thus, the MX record "testme" is itself unprotected but refers to a protected asset. Accordingly, the MX record "testme" is considered to be leaking the IP address of the origin server since a third party can determine the IP address of the origin server through the MX record "testme". As illustrated in FIG. 12, the interface 1200 of the service server 125 displays a notification 1215 that indicates that an A, AAAA, CNAME, or MX record is pointed to the origin server therefore exposing the origin IP address; and displays a notification 1220 that indicates that the MX record "testme" is exposing the origin server's IP address thereby potentially exposing the origin server to a denial of service attack.

Figure 13:
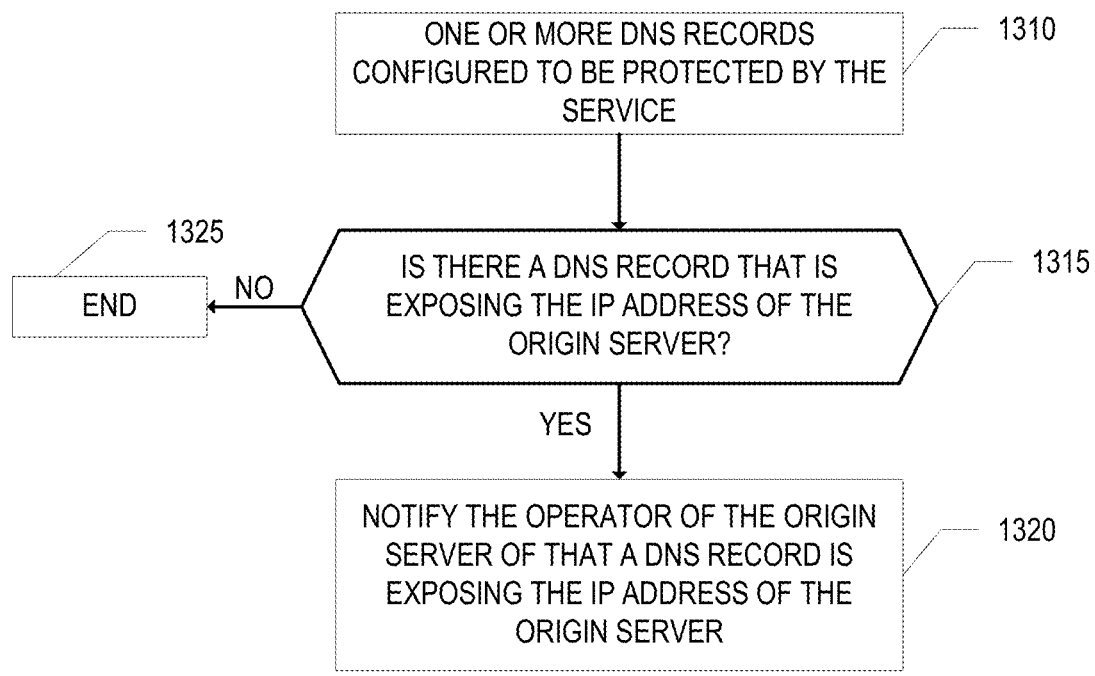
FIG. 13 is a flow diagram that illustrates exemplary operations for origin server protection notification according to an embodiment.

FIG. 13 is a flow diagram that illustrates exemplary operations for origin server protection notification according to an embodiment. In an embodiment, the operations of FIG. 13 are performed by the service server 125. At operation 1310, one or more DNS records of a site are configured to be protected by a service as described herein. For instance, one or more DNS records may point to an IP address of a proxy server of the service instead of the origin server for the site. Some records may be not protected by the service and instead may point (indirectly or directly) to an IP address of the origin server.

Next, at operation 1315, the service server 125 determines whether the configuration of the DNS records are leaking the IP address of the origin server of the site. For instance, the service server 125 may determine whether any record that is not protected by the service (does not point to an IP address of a proxy server of the service) refers to a record that is protected by the service. Any such record is deemed to be leaking the IP address of the origin server such that the IP address of the origin server may be found by a third party. If there is such a record, then flow moves to operation 1320; otherwise flow moves to operation 1325 where operations end.

At operation 1320 the service server 125 notifies the operator of each record that has been determined to be leaking the IP address of its origin server. The notification can take any number of forms. In an embodiment, and as illustrated in FIG. 12, the notification may be a pop-up result on a DNS configuration setting screen for the service that specifies which record(s) are exposing the origin server's IP address. The notification may also be sent via email or other electronic communication to the operator that is/has registering the site.

In an embodiment, the notification also instructs the operator on ways to resolve the issue. For instance, the notification may instruct the operator to remove the record if that record is not being used. As another example, if the record is an MX record that is running on the same server as the website, the notification may instruct the operator to use an email service on a separate server than the website.

The techniques shown in the figures can be implemented using code and data stored and executed on one or more electronic devices (e.g., a requesting device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
    analyzing Domain Name System (DNS) records of a single site, wherein a first one of the DNS records of the single site points to a first IP address of a proxy server of a service;
    determining that a second one of the DNS records of the single site is not pointed to a second IP address of the proxy server of the service and is referencing the first DNS record; and
    responsive to the determining, transmitting an electronic communication to an operator for the single site that includes a notification that a third IP address of an origin server of the single site is exposed through the second DNS record.

2. The method of claim 1, wherein the first IP address and the second IP address are equivalent.

3. The method of claim 1, wherein a DNS request for a domain of the first DNS record returns the first IP address of the proxy server of the service.

4. The method of claim 1, wherein a DNS request for a domain of the second DNS record returns the third IP address of the origin server of the single site.

5. The method of claim 1, wherein the notification further includes an instruction to resolve that the second DNS record of the single site is exposing the third IP address of the origin server of the single site.

6. The method of claim 5, wherein the instruction includes an instruction to remove the second DNS record of the single site.

7. The method of claim 5, wherein the second DNS record of the single site is an MX record that is running on the third IP address of the origin server of the single site, and wherein the instruction includes an instruction to use an email service that is running on a fourth IP address that is different than the third IP address of the origin server of the single site.

8. A non-transitory computer-readable medium storing instructions, which when executed by a set of one or more processors, cause the set of processors to perform operations comprising:
    analyzing Domain Name System (DNS) records of a single site, wherein a first one of the DNS records of the single site points to a first IP address of a proxy server of a service;
    determining that a second one of the DNS records of the single site is not pointed to a second IP address of the proxy server of the service and is referencing the first DNS record; and
    responsive to the determining, transmitting an electronic communication to an operator for the single site that includes a notification that a third IP address of an origin server of the single site is exposed through the second DNS record.

9. The non-transitory computer-readable medium of claim 8, wherein the first IP address and the second IP address are equivalent.

10. The non-transitory computer-readable medium of claim 8, wherein a DNS request for a domain of the first DNS record returns the first IP address of the proxy server of the service.

11. The non-transitory computer-readable medium of claim 8, wherein a DNS request for a domain of the second DNS record returns the third IP address of the origin server of the single site.

12. The non-transitory computer-readable medium of claim 8, wherein the notification further includes an instruction to resolve that the second DNS record of the single site is exposing the third IP address of the origin server of the single site.

13. The non-transitory computer-readable medium of claim 12, wherein the instruction includes an instruction to remove the second DNS record of the single site.

14. The non-transitory computer-readable medium of claim 12, wherein the second DNS record of the single site is an MX record that is running on the third IP address of the origin server of the single site, and wherein the instruction includes an instruction to use an email service that is running on a fourth IP address that is different than the third IP address of the origin server of the single site.

15. An apparatus, comprising:
    a set of one or more processors;

a set of one or more non-transitory computer-readable mediums that store instructions, that when executed by the set of processors, cause the set of processors to perform the following:

analyze Domain Name System (DNS) records of a single site, wherein a first one of the DNS records of the single site points to a first IP address of a proxy server of a service;

determine that a second one of the DNS records of the single site is not pointed to a second IP address of the proxy server of the service and is referencing the first DNS record; and responsive to the determination, transmit an electronic communication to an operator for the single site that includes a notification that a third IP address of an origin server of the single site is exposed through the second DNS record.

16. The apparatus of claim 15, wherein the first IP address and the second IP address are equivalent.

17. The apparatus of claim 15, wherein a DNS request for a domain of the first DNS record returns the first IP address of the proxy server of the service.

18. The apparatus of claim 15, wherein a DNS request for a domain of the second DNS record returns the third IP address of the origin server of the single site.

19. The apparatus of claim 15, wherein the notification further includes an instruction to resolve that the second DNS record of the single site is exposing the third IP address of the origin server of the single site.

20. The apparatus of claim 19, wherein the instruction includes an instruction to remove the second DNS record of the single site.

21. The apparatus of claim 19, wherein the second DNS record of the single site is an MX record that is running on the third IP address of the origin server of the single site, and wherein the instruction includes an instruction to use an email service that is running on a fourth IP address that is different than the third IP address of the origin server of the single site.

* * * * *